Figure 1:
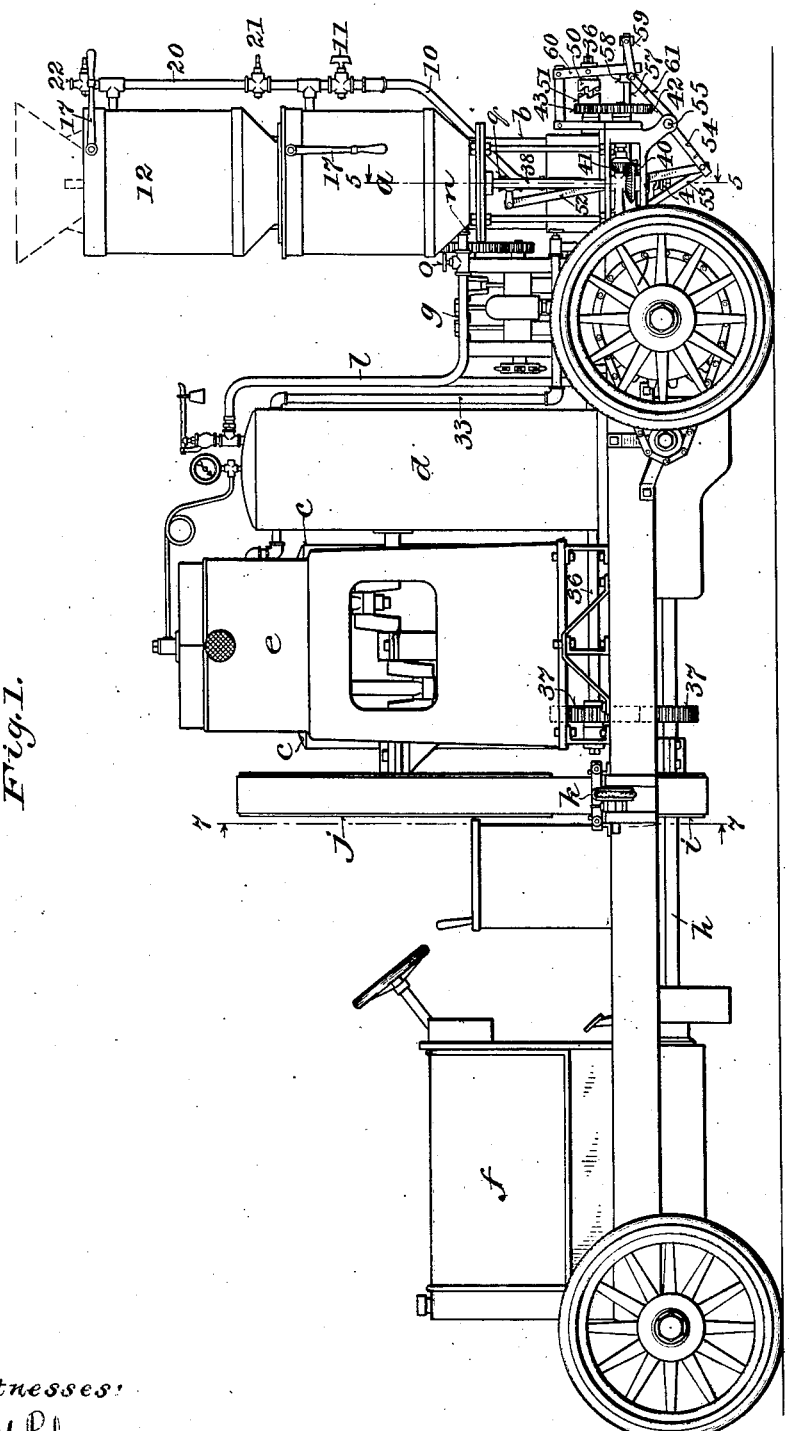

C. E. AKELEY.
APPARATUS FOR MIXING AND APPLYING PLASTIC OR ADHESIVE MATERIALS.
APPLICATION FILED SEPT. 13, 1909.

991,814.

Patented May 9, 1911.

8 SHEETS—SHEET 1.

Witnesses:
Fred Palm
Chas. L. Goss.

Inventor:
Carl E. Akeley
By Winkler Flanders Bottum Fawsett
Attorneys.

C. E. AKELEY.
APPARATUS FOR MIXING AND APPLYING PLASTIC OR ADHESIVE MATERIALS.
APPLICATION FILED SEPT. 13, 1909.

991,814.

Patented May 9, 1911.
8 SHEETS—SHEET 3.

Witnesses:
Fred Palm
Chas. L. Goss.

Inventor:
Carl E. Akeley,
By Winkler Flanders Bottum & Hansett
Attorneys.

C. E. AKELEY.
APPARATUS FOR MIXING AND APPLYING PLASTIC OR ADHESIVE MATERIALS.
APPLICATION FILED SEPT. 13, 1909.
991,814. Patented May 9, 1911.
8 SHEETS—SHEET 4.
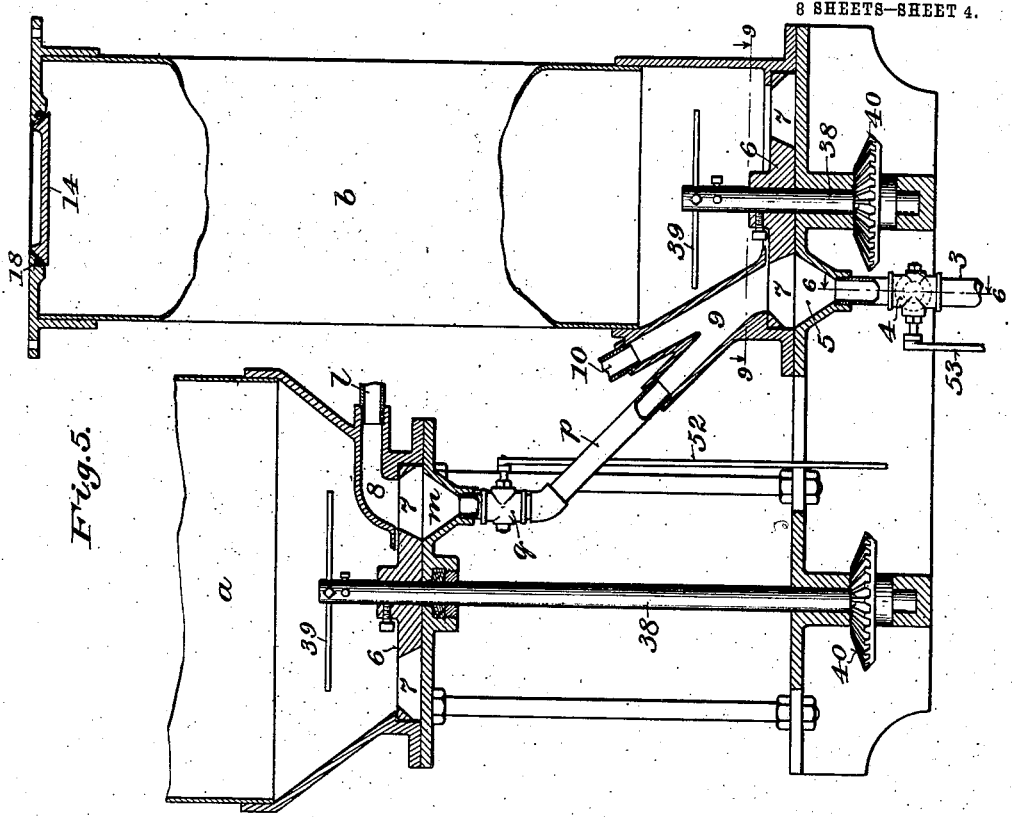
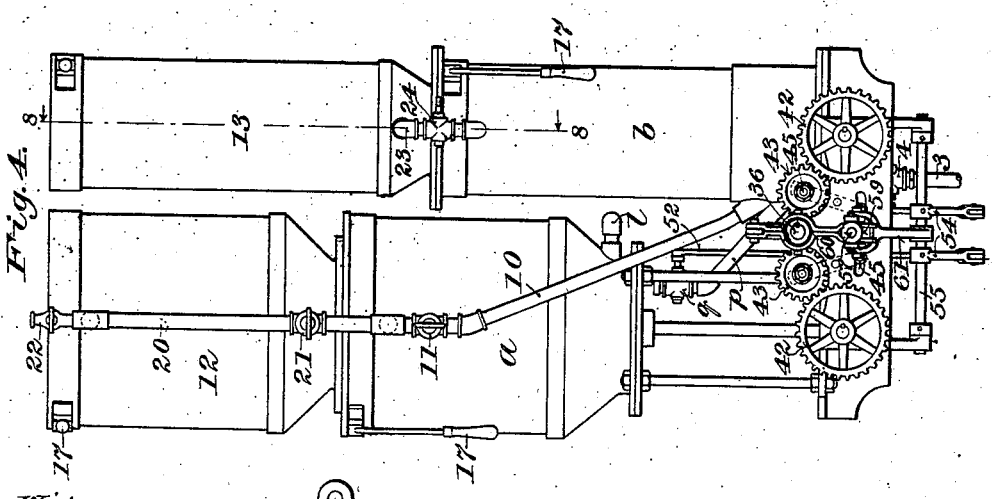
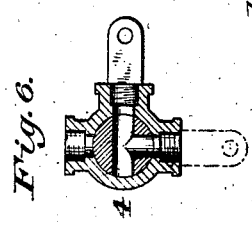
Witnesses:
Fred Palm
Chas. L. Goss.
Inventor:
Carl E. Akeley,
By Winkler, Flanders, Bottum & Fawsett
Attorneys.

C. E. AKELEY.
APPARATUS FOR MIXING AND APPLYING PLASTIC OR ADHESIVE MATERIALS.
APPLICATION FILED SEPT. 13, 1909.
991,814.
Patented May 9, 1911.
8 SHEETS—SHEET 5.
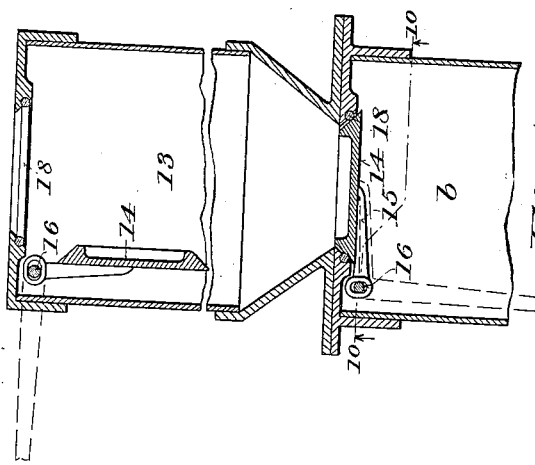
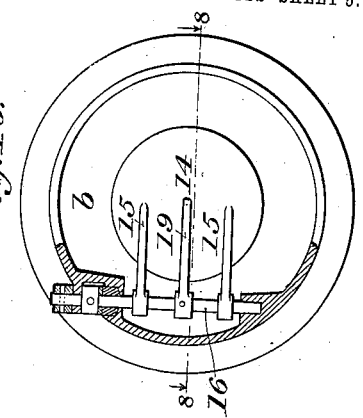
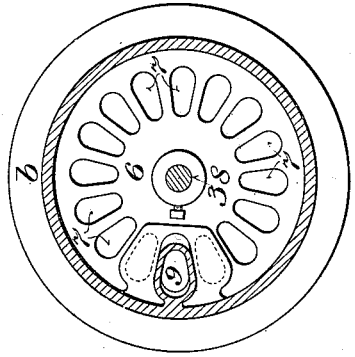
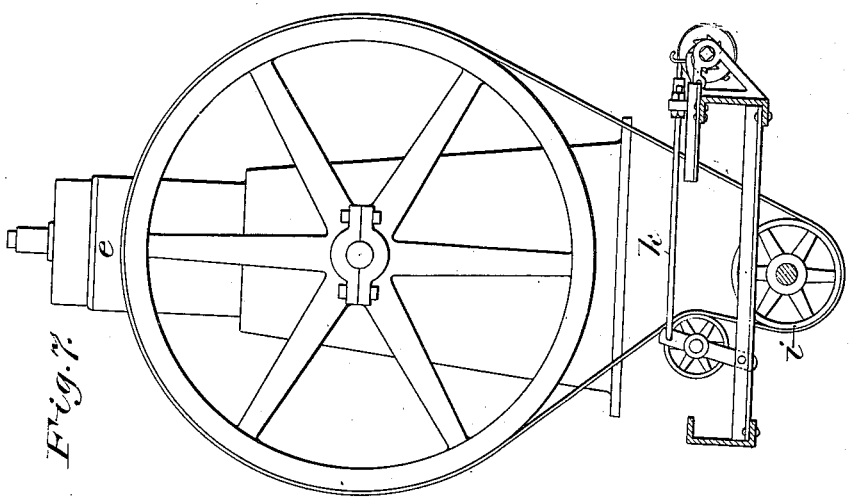
Witnesses:
Fred Palm
Chas. L. Foss
Inventor:
Carl E. Akeley.
By Winkler Flanders Bottum & Fawsett
Attorneys.

C. E. AKELEY.
APPARATUS FOR MIXING AND APPLYING PLASTIC OR ADHESIVE MATERIALS.
APPLICATION FILED SEPT. 13, 1909.
991,814.
Patented May 9, 1911.
8 SHEETS—SHEET 6.
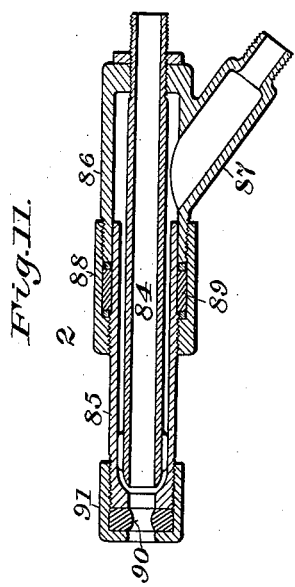
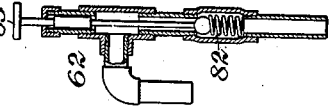
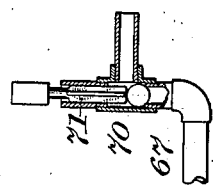
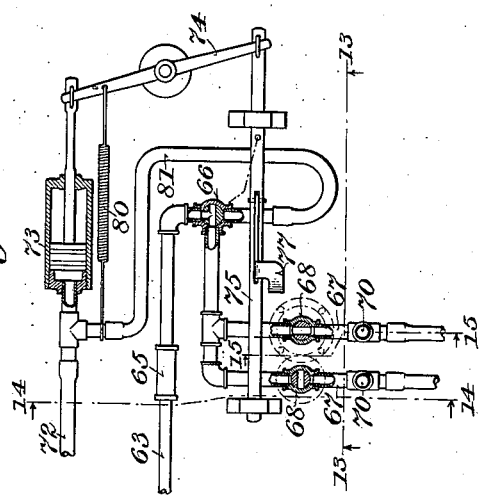
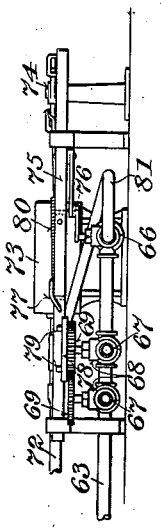
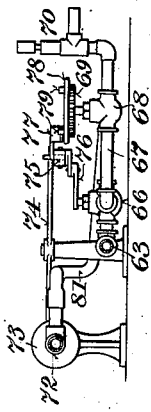
Witnesses:
Inventor:
Carl E. Akeley
By Winkler Flanders Bottum Fassett
Attorneys.

C. E. AKELEY.
APPARATUS FOR MIXING AND APPLYING PLASTIC OR ADHESIVE MATERIALS.
APPLICATION FILED SEPT. 13, 1909.

991,814.

Patented May 9, 1911.

8 SHEETS—SHEET 7.

C. E. AKELEY.
APPARATUS FOR MIXING AND APPLYING PLASTIC OR ADHESIVE MATERIALS.
APPLICATION FILED SEPT. 13, 1909.
991,814.
Patented May 9, 1911.
8 SHEETS—SHEET 8.
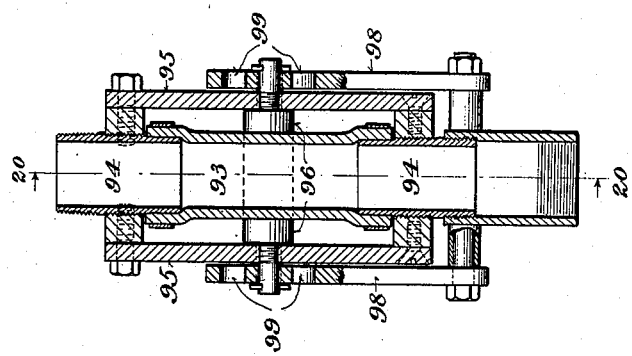
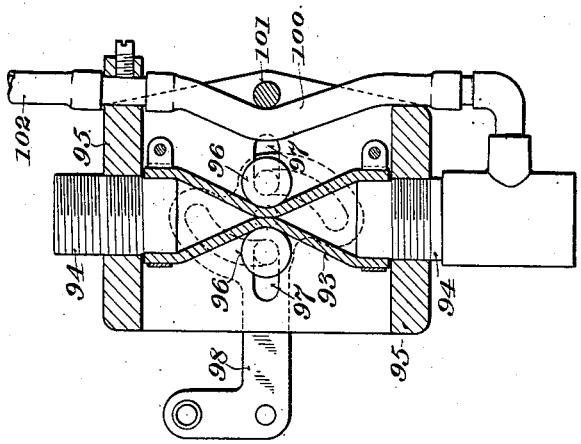
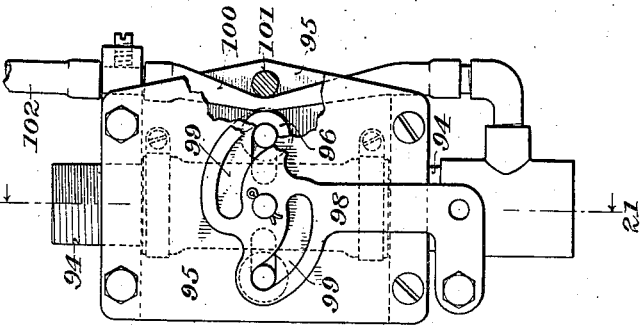
Witnesses:
Inventor:
Carl E. Akeley
By Wentler Flanders Bottum & Knowsett
Attorneys.

UNITED STATES PATENT OFFICE.

CARL E. AKELEY, OF CHICAGO, ILLINOIS, ASSIGNOR, BY MESNE ASSIGNMENTS, TO McELROY-SHEPHERD COMPANY, A CORPORATION OF NEW YORK.

APPARATUS FOR MIXING AND APPLYING PLASTIC OR ADHESIVE MATERIALS.

991,814.  Specification of Letters Patent.  Patented May 9, 1911.

Application filed September 13, 1909. Serial No. 517,448.

*To all whom it may concern:*

Be it known that I, CARL E. AKELEY, a citizen of the United States, residing at Chicago, in the county of Cook and State of Illinois, have invented certain new and useful Improvements in Apparatus for Mixing and Applying Plastic or Adhesive Materials, of which the following is a specification, reference being had to the accompanying drawing, forming a part thereof.

The main object of this invention is to provide a machine for mixing and applying hydraulic or other cements by projection. As thus applied, the cement may be used with water only or it may be mixed with water or other liquids, sand or other materials to form a mortar or concrete.

My Patent No. 984,254, dated February 14, 1911, describes a method of mixing and applying the constituent ingredients of hydraulic concrete. My present application is for one form of apparatus by which I operate the process described in said application. I, therefore, deem it unnecessary in this case to reiterate all that was disclosed in that case, but refer to the same so far as it may be applicable to this case.

In the operation of my machine I bring the dry cement or cement and sand, or equivalent dry comminuted material, either separately or mixed together in appropriate proportions, to the point of delivery adjacent to the point of application. Through a separate conveyer I bring water to the same point under pressure, and I forcibly project the elements together against an object or structure which is to be coated or which is to act as a form in depositing a body of concrete. In this operation I prefer to unite the three elements, sand, cement and water, in a suitable nozzle from which they are together forcibly projected.

An apparatus embodying my invention consists of one or more receptacles for dry material; means for supplying air or other gas under pressure; means for supplying water or other liquid under pressure; means for leading air under pressure to the receptacle for dry material; a nozzle; and separate means connecting the receptacle and the liquid supply with the nozzle.

To control and regulate the feed of the dry material from the receptacle, I provide a feeding member referred to hereinafter as a feed wheel. This feeding member is provided with pockets or perforated to receive the material, and is movably mounted, preferably inside the receptacle near its lower end so that a portion of it is between the mouth of the air inlet passage and the outlet for dry material. Means are provided for so moving the feeding member that the apertures therein, of which there may be one or more, are in turn first presented to the material in the receptacle and then brought simultaneously into range of the mouth of the air inlet and the outlet passage.

In the embodiment of the apparatus shown in the accompanying drawing, the feeding member is in the form of a wheel having a series of perforations extending in the direction of its axis and arranged in a circle concentric with such axis. Means are provided for operating the wheel intermittently at a speed which may be controlled by the operator. As the wheel rotates, the pockets pass through the body of dry material, a portion of which enters the pockets and is carried forward as the wheel rotates until the particular pocket in which it is located comes opposite the air inlet. At this point a current of air is set up from the inlet to the outlet of the receptacle through the pocket of the feed member, and the material contained in such aperture or pocket is carried out of the receptacle into the dry material feed pipe as hereinafter described. It will be apparent that the feeding member may be otherwise formed within the scope of my invention, and that it may be actuated in most any manner to bring one or more perforations therein periodically in range of the inlet and the outlet pipes.

I find it desirable to so construct the mouth of the air inlet feed member and the outlet, that there is a space for the escape of a portion of the air admitted, so that a part of it passes upward through the material. In this way the dry material is stirred to prevent packing, and thoroughly mixed; also sufficient air pressure is maintained on top of the material to cause it to fill the apertures of the feed wheel as they are presented.

Other features of my invention reside in the construction, arrangement and combination of parts, the nature of which will more fully appear from the following description.

In the accompanying drawing like characters designate the same parts in the several figures.

Figure 2:
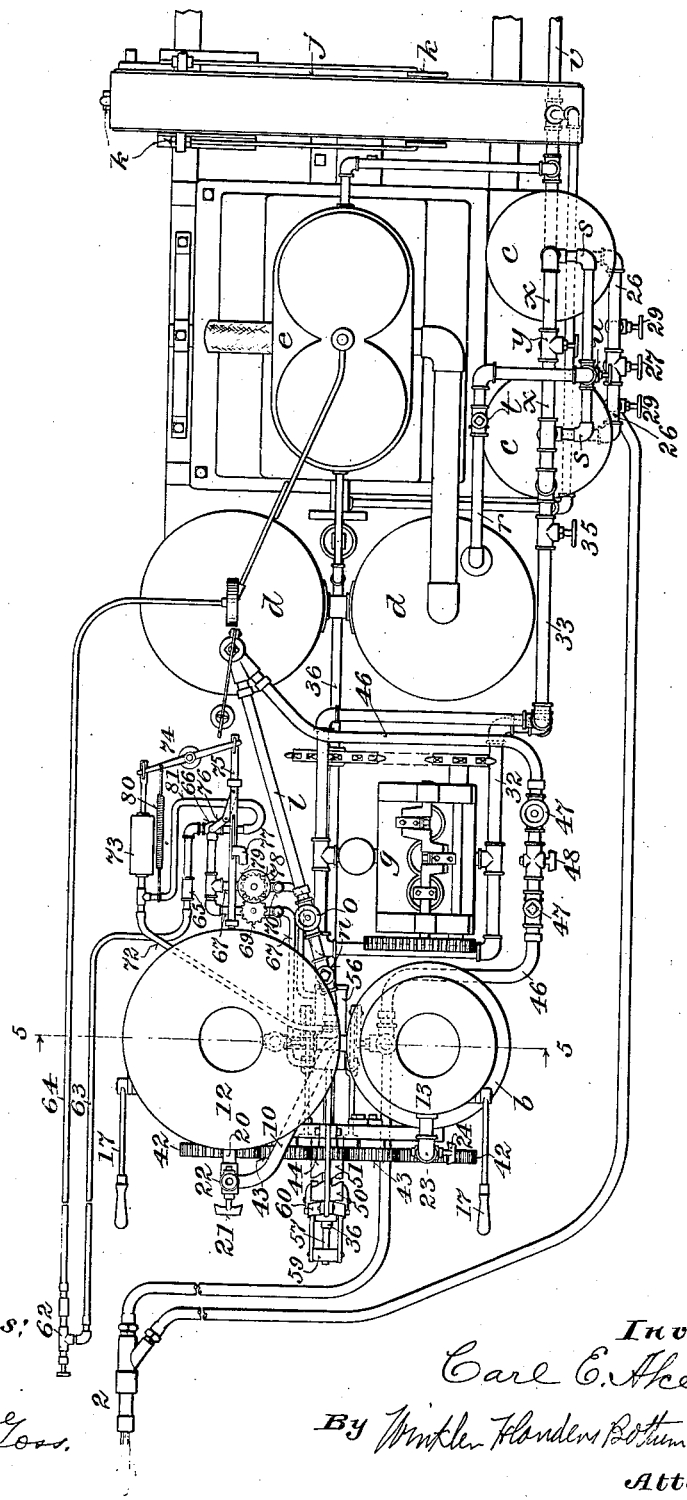
Figure 3:
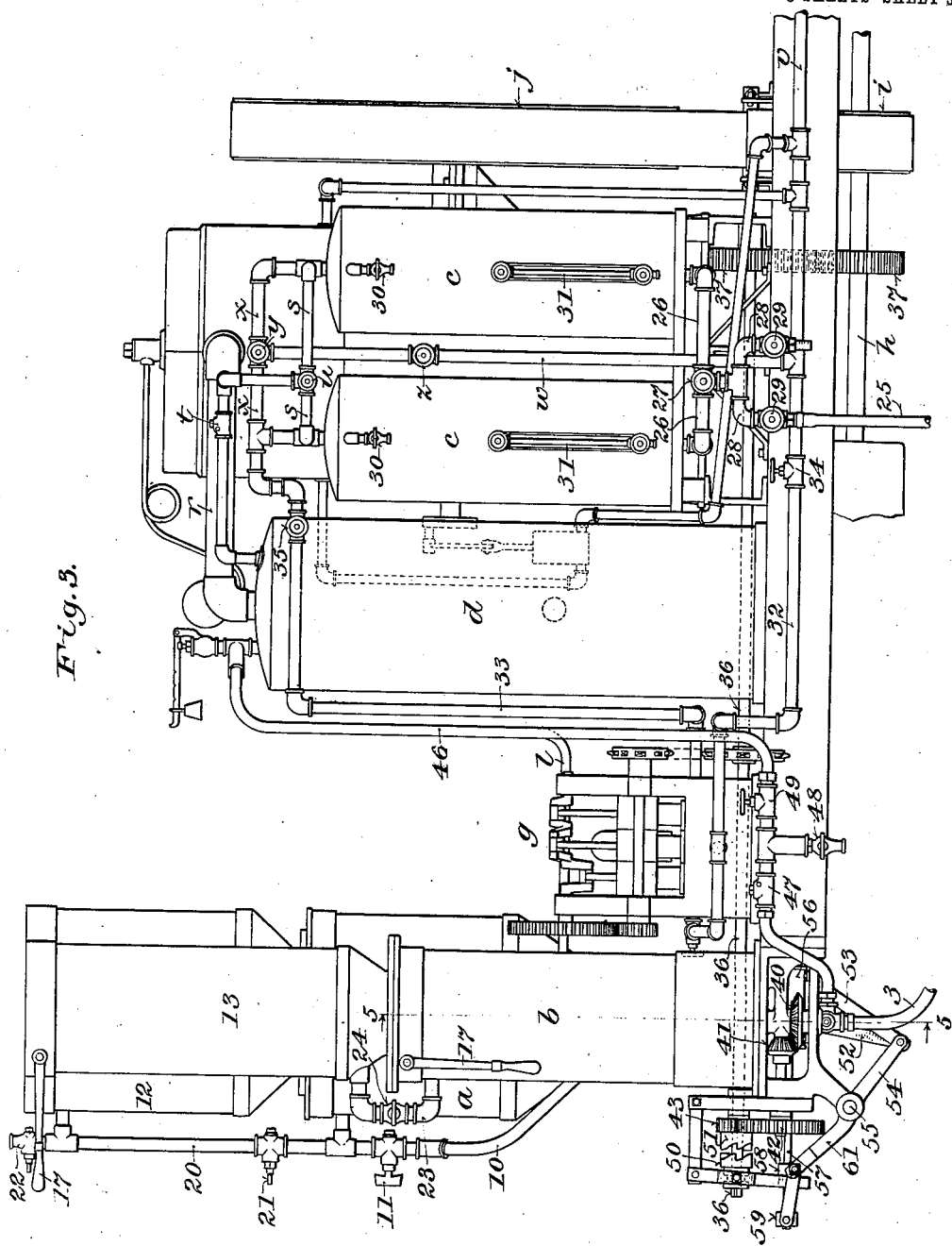
Figure 17:
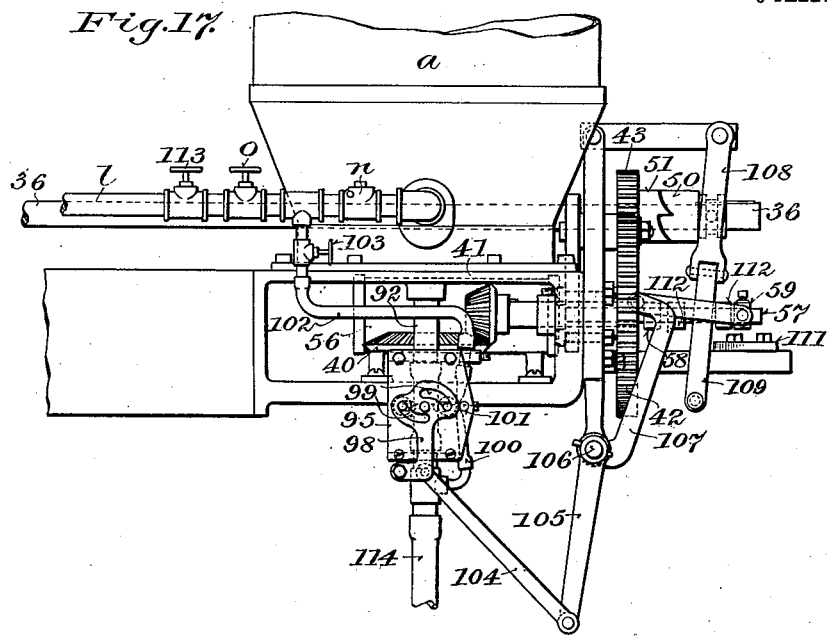
Figure 18:
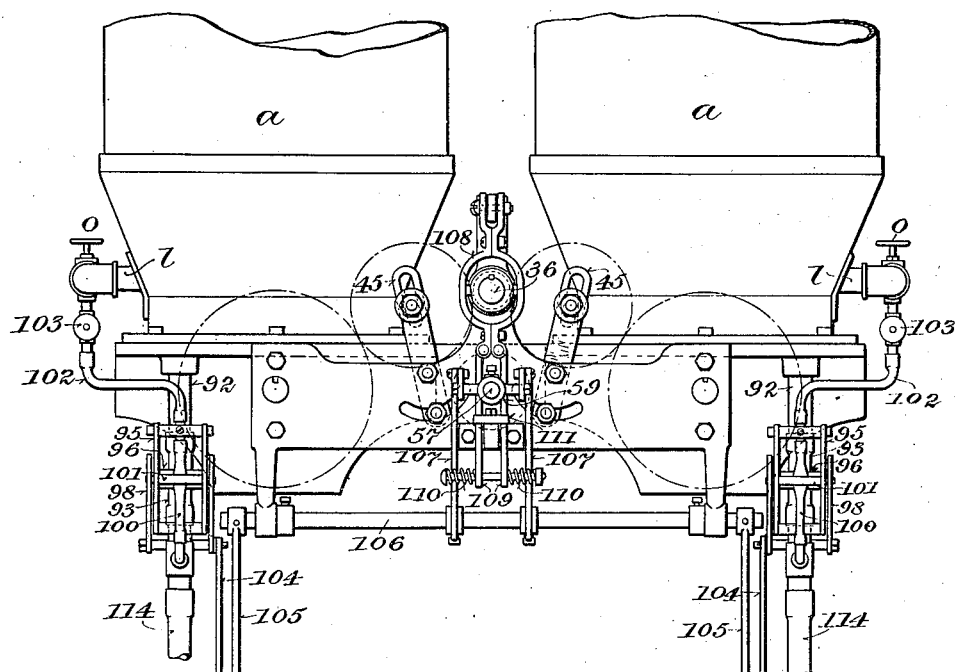

Figure 1 is a side elevation of one form of portable apparatus embodying the invention; Fig. 2 is a plan view, and Fig. 3 is a reverse side elevation on a somewhat enlarged scale of a part of the apparatus shown in Fig. 1; Fig. 4 is a rear elevation; Fig. 5 is an enlarged vertical cross section on the line 5 5, Figs. 1, 2 and 3; Fig. 6 is an enlarged sectional detail view of the three-way valve in the delivery connection of one of the receptacles for dry material; Fig. 7 is an enlarged vertical cross section on the line 7 7, Fig. 1, and a side elevation of the compressor and its driving connection; Fig. 8 is a vertical section on the line 8 8, Figs. 4 and 10 of the upper part of one of the receptacles for dry material, with the filling receptacle mounted thereon; Fig. 9 is a horizontal section on the line 9 9, Fig. 5, showing the feed wheel and compressed air connection of said receptacle; Fig. 10 is an inverted plan view and section on the line 10 10, Fig. 8, of the closure for said receptacle; Fig. 11 is an enlarged longitudinal section of the nozzle forming a part of the apparatus; Figs. 12, 13, 14 and 15 are enlarged detail views of mechanism for controlling the delivery of dry material to the nozzle, Fig. 12 being a plan view with parts shown in horizontal section, Fig. 13 a side elevation and vertical section on the line 13 13, Fig. 12, Fig. 14 an end elevation and partial section on the line 14 14, Fig. 12, and Fig. 15 a section on the line 15 15, Fig. 12; Fig. 16 is an enlarged sectional view of the portable valve for manually controlling the operation of the mechanism shown by Figs. 12, 13, 14 and 15; Figs. 17 and 18 are side and rear elevations respectively of the lower part of the receptacles for dry material, showing a modification of their compressed air and delivery connections and of the mechanism for controlling the feed of dry material; and Figs. 19, 20 and 21 are enlarged detail views of the valve mechanism shown in Figs. 17 and 18 for controlling the feed of dry material to the nozzle and the admission of compressed air to the feed pipes when the delivery of material into them is shut off, Fig. 19 being a side elevation, Fig. 20 a longitudinal section on the line 20 20, Fig. 21, and Fig. 21 a longitudinal section on the line 21 21, Fig. 19.

The apparatus, comprising in the present case two closed receptacles $a$ and $b$ for dry powdered or comminuted materials, two closed reservoirs $c$ for water or other liquid, two compressed air tanks $d$, a compressor $e$, a motor $f$ and a pump $g$, is mounted on a portable base or frame which may be as shown in Fig. 1, the body or frame of a car provided with suitable running gear, which may be connected with and operated by the motor $f$.

The compressor $e$, as shown in Figs. 1, 2, 3 and 7, may be driven from the motor shaft $h$ by a belt passing around a pulley $i$ on said shaft and a pulley $j$ on the crank shaft of the compressor. When the apparatus is to be moved from place to place or is not in use, the compressor is rendered inactive, leaving the motor $f$ free for propelling the car. The belt is thrown into and out of engagement by means of a belt tightener $k$.

To provide for the desired capacity and for convenience of construction, the apparatus is shown as having two closed air tanks $d$, which are connected and freely communicate with each other, as shown in Fig. 2. One of these tanks is connected with the discharge pipe of the compressor $e$, and one of them is connected by a pipe $l$ with the lower part of the receptacle $a$, adjacent to and opposite a discharge opening $m$ in the bottom of said receptacle, as shown in Fig. 5. The pipe $l$ is provided with a check valve, $n$ opening toward the receptacle $a$, and with a valve $o$ for closing communication between said receptacle and the air tanks $d$. The discharge opening $m$ of receptacle $a$ is connected as shown in Fig. 5, by a pipe $p$ with the lower part of receptacle $b$. This pipe is provided adjacent to said discharge opening with a valve $q$.

One of the tanks $d$ is connected as shown in Figs. 2 and 3, by a pipe $r$ and branches $s$ with the reservoirs $c$. This pipe is provided with a check valve $t$ opening toward said reservoirs and at the junction of the branches $s$ with a three-way valve $u$ for admitting compressed air into either reservoir and shutting it off from the other.

A water or liquid supply pipe $v$ is connected as shown in Figs. 2 and 3, by a pipe $w$ and branches $x$ with the reservoirs $c$. The pipe $w$ is provided at the junction of the branches $x$ with a three-way valve $y$ for admitting water into either reservoir and shutting it off from the other. It is also provided with a valve $z$ for closing communication between the branches $x$ and the main supply pipe $v$.

A nozzle 2 shown in Fig. 2, is connected by a hose or flexible pipe 3 (see Fig. 3) and a three-way valve 4 adjacent to the receptacle $b$ with the discharge opening 5 in the bottom of said receptacle, as shown in Fig. 5.

Each of the receptacles $a$ and $b$ is provided at the bottom with a feed wheel 6, having one or a series of openings 7. If a series they may be arranged in a circle to register one after another when the wheel is turned with the discharge opening $m$ or 5 below, and with the opening in the compressed air supply connection 8 or 9 above. The connections 8 and 9 are extended as shown in Fig. 9, to cover a part of the feed wheels adjoining the openings 7, which are in register with the discharge openings $m$ and 5, thus partially confining the air blast or current and directing it through the openings 7 as they are brought one after another into register with the openings $m$ and 5. To avoid clogging and to insure the free and regular delivery of the dry materials from said receptacles $a$ and $b$, the openings 7 in the feed wheels are preferably made flaring or enlarged downwardly, while the discharge openings $m$ and 5 are made correspondingly flaring or enlarged upwardly. To facilitate the delivery of the dry material from said receptacles, sufficient clearance is allowed between the mouths of the inlet connections 8 and 9 and the upper faces of the associated feed wheels 6 to permit compressed air to pass upwardly through the material contained in said receptacles, thus tending to loosen it as well as subjecting it to pressure in the upper part of the receptacles.

To insure the requisite pressure and maintain the air blast or current through the connection 9 of receptacle $b$ in case the connection with receptacle $a$ through the pipe $p$ becomes clogged or obstructed, a pipe 10 leads from the upper part of receptacle $a$ into the lower part of receptacle $b$ through the connection 9. This pipe is provided with a valve 11 for closing communication through it between the two receptacles.

For replenishing the receptacles $a$ and $b$ with dry material without stopping the apparatus, filling receptacles 12 and 13 are provided. Each of these receptacles, which may be formed with or mounted upon the receptacle $a$ or $b$ with which it is associated, opens at the bottom into the associated receptacle, and has a filling opening at the top, as shown in Fig. 8. These openings are provided with inwardly or downwardly opening closures 14, having arms 15 which are loosely pivoted on transverse rocker shafts 16 extending at one end through the walls of the receptacles and provided outside thereof with operating arms or handles 17, as shown in Figs. 2, 3 and 4. The closures and the openings in which they are seated, are preferably formed with correspondingly beveled faces, and the seats are formed with recesses in which are inserted and held elastic packing rings 18 to insure air tight joints. The loose connections of the arms 15 or the shafts 16 permit the closures to adjust themselves to their seats and bear with uniform force all around against the packing rings 18. On the shafts 16 between the arms 15 are fixed closing arms 19 arranged to bear centrally against the under sides of the closures and press and hold them firmly and evenly against the packing rings. These closures are adapted to be held shut by the air pressure in the receptacles and to open automatically by gravity when such pressure is removed, or in case of the lower closures when air pressure is admitted into the filling receptacles 12 and 13.

In order to admit compressed air into the filling receptacles 12 and 13 for transferring the contents thereof into the receptacles $a$ and $b$ without releasing the pressure therefrom, and thereby interrupting the operation of the apparatus, the upper part of receptacle $a$ is connected as shown in Figs. 3 and 4, with the upper part of receptacle 12 by a pipe 20, which is provided with a valve 21 between its connections with said receptacles, and at its upper end with a vent cock 22, and the upper part of the receptacle $b$ is connected with the lower part of the receptacle 13 by a pipe 23, which is provided with a valve 24.

A branch of the nozzle 2 is connected by a hose or flexible pipe 25, and by branch pipes 26, as shown in Figs. 2 and 3, with the lower part of the liquid reservoirs $c$. At the intersection of the branches 26 with the pipe to which the hose 25 is attached, is a three-way valve 27 for admitting liquid from either reservoir through said hose to the nozzle while communication between the hose and the other reservoir is shut off. To supply a number of nozzles at the same time with liquid, two or more branches 28, provided with hose couplings and with valves 29, may be connected with the branches 26 through the three-way valve 27.

To release air from the reservoir $c$ in order to refill them with water, they are provided at or near the top with vent cocks 30, and to determine when they should be refilled, they are preferably provided with sight glasses 31, as shown in Fig. 3.

For filling the reservoirs $c$ where a supply of water under sufficient pressure is not available, the apparatus is supplied with the pump $g$, which may be connected as shown in Figs. 2 and 3, on the suction side with the liquid supply pipe $v$ by a pipe 32, and on the discharge side with the branch pipes $x$ by a pipe 33. The pipe 32 is provided with a valve 34 and the pipe 33 with a valve 35 for cutting the pump out when it is not needed. The pump $g$ may be driven by a suitable connection, as shown in Fig. 3, with a shaft 36 extending lengthwise of the supporting base or frame parallel with the motor shaft $h$ with which it is connected by gears 37.

The feed wheels 6 are fixed on vertical shafts 38 which extend above said wheels and are provided adjacent thereto in the lower part of the receptacles a and b with agitators 39, as shown in Fig. 5. The shafts 38 extend downwardly through the bottoms of said receptacles and are provided at their lower ends with bevel gears 40 meshing as shown in Figs. 1 and 3 with bevel gears or pinions 41 on horizontal shafts which are connected with the driving shaft 36, as shown in Figs. 2 and 4, by gears 42, 43 and 44. The gears 43 are mounted, as shown in Fig. 4, and on a larger scale and more clearly in Fig. 18, on adjustable arms or supports 45, so that gears of different sizes may be substituted therefor, and also if desired for the gears 42, to vary the speed of the feed wheels 6, as may be desired for the delivery of different materials or materials under different conditions or for different kinds of work.

To clear the hose pipe 3 when the delivery of dry material is stopped by closing the valves $q$ and 4, it is connected through a branch of the three-way valve 4 adjacent to receptacle $b$, with one of the air tanks by a pipe 46, which is provided as shown in Figs. 2 and 3, with a check valve 47 closing toward said tank, a drain and vent cock 48 and a valve 49 for closing communication between said tank and the hose pipe 3.

The gear 44 is loosely mounted on the driving shaft 36 and said shaft is provided as shown in Figs. 1, 2 and 3, with a clutch member 50, which is splined or feathered and movable thereon into and out of engagement with a corresponding clutch member 51 on said gear, for stopping and starting the feed wheels 6.

For operating the valves $q$ and 4 their stems are provided with arms which are connected by links 52 and 53 as shown in Figs. 1, 3 and 4, with arms 54 on a transverse rocker shaft 55.

To simultaneously or successively operate the clutch member 50 and the valves $q$ and 4, and to enable the operator who has charge of the nozzle 2 to control their operation at a distance without leaving his position at the nozzle, a motor cylinder 56 is arranged below and parallel with the driving shaft 36, as shown in Figs. 2 and 3. The rearwardly projecting rod 57 of the motor piston is provided with tappets 58 and 59, which are arranged by engagement with a forked lever 60 to throw the clutch member 50 out of and into engagement with the clutch member 51. The piston rod is connected by links with a forked arm 61 on the rocker shaft 55, so as to open or close the valves $q$ and 4 when the clutch members are engaged or disengaged. The clutch and valve operating connections are preferably adjusted to stop the feed wheels 6 just before the valves $q$ and 4 are turned to close the delivery connections of receptacles $a$ and $b$ and to open said valves just before the feed wheels are started, in order to prevent the choking or clogging of said delivery connections with the dry materials.

The operation of the motor cylinder 56 is controlled by the mechanism shown in detail in Figs. 12, 13, 14 and 15, which is in turn controlled by the manipulation of a portable valve 62 carried by the operator and having flexible pipe connections 63 and 64 with such mechanism, and with one of the compressed air tanks $d$, as shown in Fig. 2.

Referring to Figs. 12, 13, 14 and 15, showing the controlling mechanism for the motor which operates the feed valves and the clutch which controls the operation of the feed wheels, the hose 63 is connected through a filter 65 and a three-way valve 66 with branch pipes 67 leading to opposite ends of the cylinder 56, as shown in Fig. 2. The pipes 67 are provided with rotary valves 68, the stems of which are connected by gears 69, as shown in Fig. 2, so that when one of the valves is closed the other will be opened, as shown in Fig. 12. Each of these pipes is also provided with a gravity exhaust valve 70, which in its normal position, as shown in Fig. 15, when the associated valve 68 is closed, permits air to escape from the cylinder 56 through the exhaust port or passage 71, but when compressed air is admitted thereto by the opening of the associated valve 68, is lifted and closes the exhaust port 71. The compressed air passing the valve 68 is thus directed by the valve 70 in its upper position into the motor cylinder 56. The motor cylinder 56 is connected midway between its ends, as shown in Fig. 2, by a pipe 72 with one end of a cylinder 73, the piston of which is connected by a lever 74 with a longitudinally sliding bar 75. This bar is connected by a link with an arm 76 on the stem of the valve 66 and is provided with a pivoted dog 77. On the stem of one of the valves 68 is fixed a disk 78 which is provided with four pins or lugs 79, with which the dog 77 engages when the bar 75 is advanced by the piston of cylinder 73, the pins or lugs being so arranged that each advance movement of said bar will turn said disk through an arc of ninety degrees and open one of the valves 68 and close the other. In the return movement of the bar 75, the dog 77 rides over the pin or projection 79, which has been turned into its path by the previous advance of the bar, without effect upon said valves. The piston of the cylinder 73 is retracted and held normally in the position in which it is shown in Fig. 12 by a spring 80. The three-way valve 66 is connected by a pipe 81 with the pipe 72 adjacent to the cylinder 73, and when the bar 75 is advanced it turns the valve 66 from the position in which it is shown in Fig. 12 into position to close communication between the supply pipe 63 and the branch pipes 67 and admit air from said supply pipe through the pipe 81 into the cylinder 73.

The portable valve 62 which the operator carries, is held normally closed by a spring 82, as shown in Fig. 16, and is opened by means of a push button 83.

Referring to Fig. 11, the nozzle 2, being one of various kinds which may be used in the apparatus, comprises inner and outer tubes 84 and 85, and a tubular body 86 in which they are coaxially fitted and secured. The inner tube 84 is threaded at one end in the contracted end of the body 86 through which it passes, and the flexible pipe 3 for conveying dry material to the nozzle is connected therewith. The body 86 is provided with a branch 87 with which the flexible pipe 25 for conveying liquid to the nozzle is connected. The outer tube 85 is fitted and movable endwise in the open end of the body 86, and is adjustably secured therein by a recessed coupling sleeve 88, which is threaded at one end on the tube 85 and at the other end on the body 86. A packing ring 89 inserted between metal washers in said coupling sleeve around the tube 85, prevents the liquid with which the nozzle is supplied from reaching and rusting the screwthreads between said tube and sleeve and thereby interfering with the adjustment of said tube. The tube 85 forms with the inner tube 84, an annular passage for the liquid, and the bore of said tube 85 is contracted at its delivery end so as to direct the liquid as it is discharged from said annular passage into the dry material as it issues from the inner tube 84. A mouth piece 90 made of soft rubber which will not be rapidly worn away by sharp sand and the like, is detachably secured to the delivery end of the nozzle by a flanged coupling ring 91 threaded on the outer tube 85. By the adjustment of the coupling ring on the tube 85 the mouth piece may be compressed more or less and the area of the orifice therein varied as may be desired, for the most effective operation with different kinds of material and for different kinds of work.

Instead of arranging the delivery connections of the receptacles for dry material as shown in Figs. 4 and 5, it may be preferable in certain cases and for some materials, to provide such receptacles with separate delivery and compressed air supply connections, as shown in Figs. 17 and 18. With this arrangement two or more like or similar receptacles *a* are arranged preferably side by side with their lower ends or heads resting on the same base or frame, and a compressed air supply pipe *l* leads into the lower part of each receptacle, and each receptacle is provided at the bottom with a connection 92 similar to that of receptacle *a*, as shown in Fig. 5. Each delivery connection is provided with a valve consisting as shown in detail in Figs. 19, 20 and 21, of a short section 93 of rubber hose fastened at the ends on pipe nipples 94, which are threaded in end plates or pieces of a frame or housing 95, opposing rollers 96 journaled and guided at the ends in transverse slots 97 in the side plates or pieces of the frames 95 and connected cam levers 98 fulcrumed on the sides of the frames 95 and having curved slots 99 engaging with the journals of said rollers. The slots 97 and 99 are so formed and arranged that when the levers 98 are turned down as shown in Fig. 19 the opposing rollers 96 will be separated and withdrawn from the interposed hose sections 93, and when said levers are turned up as shown in Fig. 20, the rollers will be forced together against said hose sections, closing the passages through them. Each delivery connection has a hose section 100 passing between one of the rollers 96 and an opposing cross piece or abutment 101 and connected at one end by a pipe 102 with the pipe *l* and at the other end with the delivery pipe below the hose section 93. Each pipe 102 is provided with a valve 103. Each hose section 100 with the pipe 102 forms a bypass for compressed air around the main valve, and the cross piece or abutment 101 and the opposing roller 96 between which the hose section 100 passes are so arranged that when the main valve is open, as shown in Fig. 19, the hose section 100 will be compressed and the passage through it closed, and when the main valve is closed as shown in Fig. 20, said hose section 100 will be released, thus permitting it to resume its normal condition with an open passage through it. With some kinds of material and with materials in certain conditions, delivery valves of this kind are preferable to those shown in Figs. 5 and 6, because they are not so liable to become clogged. The cam levers 98 are connected, as shown in Figs. 17 and 18, by links 104 with arms 105 on a rocker shaft 106, which has arms 107 connected by links with the piston rod 57.

The lever 108 connected with the clutch member 50 is provided at its lower end with pivoted arms 109, which straddle the piston rod 57 and are yieldingly held together by springs 110 on a bolt passing loosely through their lower ends. A fixed wedge 111 in the path of the arms 109 spreads them apart so that the inner tappet 112 on the piston rod 57 will pass between them, permitting the further traverse of the piston rod for closing the delivery valves after the clutch has been disengaged. The outer tappet 112 has wings or projections on the sides which engage with the arms 109, force them off from the wedge or spreader 111 and carry the clutch member 50 into engagement with the clutch member 51 when the piston rod 57 is withdrawn to the left. The tappet 58 located inside of the inner tappet 112, is also provided with wings or projections on the sides to engage with the arms 109 and prevent them from being jarred off from the wedge 111 when the piston rod 57 is moved to the extreme right for closing the feed valves. By this arrangement of the clutch and valve operating devices the feed wheels are stopped before the feed valves are closed, and the valves are opened before the feed wheels are started, thus preventing the clogging of the delivery connections.

In addition to the shut off valves $o$ in the compressed air supply pipes leading into the receptacles $a$, said pipes may be provided with separate regulating valves 113. The delivery valves of the receptacles $a$ are connected by separate sections of hose or pipes 114 with the nozzle or with the hose or pipe 3 leading thereto.

The apparatus operates as follows: The receptacles $a$ and $b$ being supplied with the desired dry materials in a powdered or comminuted form, as for example sand, in receptacle $a$, and stucco in receptacle $b$, the closures 14 at their upper ends are shut, and compressed air from the tanks $d$ is admitted through the pipe $l$ into receptacle $a$ in which it works upwardly through the sand into the upper part of the receptacle, whence it passes through the pipe 10 into the lower part of receptacle $b$, working its way upwardly through the material contained therein. In its passage upwardly through the materials in said receptacles the air tends to loosen such materials, so that they will feed more readily. Moisture carried by the air is absorbed by the sand, which is less liable to become caked or lumpy than the stucco, so that when the air passes from receptacle $a$ into the receptacle $b$, it is comparatively dry, and will leave the stucco in a loose, friable condition, suitable for feeding. When pressure has been thus established in said receptacles, the closures 14 will be held thereby tightly shut. One or both reservoirs $c$ being supplied with water, and compressed air being admitted into the upper part of the one from which the nozzle is to be supplied, the valve 27 is turned to allow the water to pass into the hose 25 leading to the nozzle. The motor $f$ and the compressor $e$ having been started, the operator by means of the valve 62 opens the delivery valves $q$ and 4, and starts the feed wheels 6. As the feed wheels are turned the openings 7 uncovered by the air inlet connections 8 and 9, are filled with sand in receptacles $a$, and with stucco in receptacle $b$, and as said openings pass under said connections into register with the discharge openings $m$ and 5, the sand is carried by the air blast or current entering receptacle $a$ from pipe $l$, through the pipe $p$, taking along and mingling with the stucco brought into its course by the feed wheel in receptacle $b$. The mingled sand and stucco are conveyed thence by the air blast or current through the hose 3 to the nozzle 2, in which they pass through the inner tube 84 and are mixed with the water issuing in a conical or annular jet from the orifice between the delivery end of said tube and the outer tube 85. Immediately after the dry and liquid ingredients of the plastic or adhesive mixture are thus brought together, they are impelled by the air blast and the force of the liquid jet from the nozzle and applied to or deposited upon the surface or structure to be coated or covered in a compact dense condition.

By screwing the outer tube 85 more or less into or out of the body 86 of the nozzle, the area of the annular discharge orifice for the liquid and the relative proportions of the liquid and dry ingredients of the mixture may be varied as desired. The feed of dry material may be varied by the substitution of gears of different sizes for the gears 43 or for both the gears 42 and 43, through which the feed wheels 6 are driven.

To replenish either of the receptacles $a$ and $b$ without interrupting the operation of the apparatus, a charge of dry material is introduced into the associated filling receptacle 12 or 13 by means of a hopper, as indicated by dotted lines in Fig. 1. The closure at the top of said filling receptacle is then shut by hand and held till compressed air is admitted above the fresh charge by opening the valve 21 or 24 in the pipe connection 20 or 23, and the pressure in the upper and lower receptacles is equalized. When this occurs the closure 14 between the two receptacles opens automatically by gravity and the charge falls from the upper into the lower receptacle. The closure between the receptacles is then closed by hand and held in place while the valve 21 or 24 is closed, and the cock 22 is opened, or the compressed air is otherwise released from the filling receptacle, as by opening the closure 14 at the upper end thereof. The valve 11 in pipe 10 should be closed temporarily while the valve 21 is open for charging receptacle $a$.

To replenish either reservoir $c$ when the liquid is nearly exhausted therefrom as indicated by the sight glass 31, the hose connection 25 leading to the nozzle is switched to the other reservoir by turning the valve 27, and compressed air is admitted to that reservoir and shut off from the reservoir to be replenished with liquid, by turning the valve $u$. The vent cock 30 of the reservoir which has thus been cut out is opened to permit the air to exhaust therefrom, and water is turned on from the main $v$ through the pipe w or from the pump g through the pipe 33, by opening the valve z or 35 and turning the three-way valve y into the proper position. When the reservoir is filled with liquid its vent cock is closed and the valve z or 35 is closed, or the valve y may be turned into position to shut off both reservoirs from the water supply.

Whenever during the operation of the apparatus it is desired for any reason to stop the feed of dry material, the operator presses the push button 83, thereby opening the valve 62 and supplying compressed air through the hose connections 63 and 64 from the air tanks d to the controlling mechanism, the parts of which being in positions shown in Fig. 12, such compressed air is admitted through the open valve 68 into the inner or right hand end of cylinder 56, as shown in Fig. 2. The piston rod 57 is thrust out or to the left, and operates first through the tappet 58 and lever 60 to disengage the clutch members 50 and 51, thereby stopping the feed wheels and then, by its continued movement through the rocker shaft 55 and its connections, to close the delivery valves q and 4. When the three-way valve 4 is thus turned, as shown in Fig. 6, to close the delivery pipe from receptacle b, it establishes communication between said pipe and the bypass pipe 46, thus admitting compressed air into the feed pipe or hose 3 to remove the loose dry material therefrom and keep it clear for the resumption of work.

As soon as the piston in the cylinder 56 passes the pipe connection 72, compressed air is admitted through said connection into the cylinder 73 and forces the piston therein to the right, thus operating through connections hereinbefore described, to turn the valves 66 and 68, closing communication between the air supply pipe 63 and the branch pipes 67 and opening communication between said supply pipe and the cylinder 73 through the pipe 81 and at the same time closing the valve 68 in the branch leading to the inner or right hand end of cylinder 56 and opening the other valve 68. As soon as either of the valves 68 is closed or pressure is shut off therefrom by the turning of the valve 66, the associated valve 70 will drop from its upper to its lower seat and thus open that end of the cylinder 56 with which it is connected to exhaust through the associated port or passage 71. The admission of compressed air through the pipe 81 into the cylinder 73 insures a quick and positive completion of the stroke of the piston in said cylinder after the supply of compressed air through the pipe 72 has been cut off. The push button 83 being released by the operator, the valve 62 is automatically closed by the spring 82 cutting off the supply of compressed air to the controlling mechanisms. The piston in cylinder 73 and parts connected therewith will then be returned to their original positions by the spring 80, the air being exhausted from said cylinder through the pipe 72 and the open exhaust valve 70 which is then in communication therewith. To start the feed of dry material, the operator momentarily opens the valve 62 as before, and the operations of the controlling mechanism are repeated as above explained, the piston rod 57 is withdrawn to the right, the delivery valves q and 4 are opened and the feed wheels 6 are then started.

When several dry materials are used to produce the plastic or adhesive mixture, they may be mixed in the proper proportions and placed in a single receptacle, from which they are to be supplied to the nozzle, or they may be delivered to the nozzle at properly regulated rates in the desired proportions from separate receptacles. Different liquids may also be mixed in the desired proportions and supplied to the nozzle from a single reservoir, or they may be supplied from separate reservoirs.

Where a supply of compressed air is available, the compressor e and even the storage tanks d may be dispensed with, and where a suitable water supply under sufficient head or pressure is at hand, the pump g may be omitted. In short, various changes in details of construction and arrangement of parts may be made to adapt the apparatus to varying conditions for use with different materials and for different kinds of work without affecting the principle of the apparatus or departing from the spirit and scope of the invention.

The term "dry" as herein used is intended to designate not necessarily absolutely dry material, but relatively dry material such as can be practicably conveyed through a hose or pipe.

I claim:

1. In apparatus for mixing and applying plastic or adhesive material, the combination of a receptacle for dry material having a discharge opening in the lower part thereof, a feed wheel having openings adapted to register one after another with said discharge opening, means for actuating the feed wheel, a compressed air supply connection having a discharge opening in the receptacle adjacent to said feed wheel, a nozzle connected with said discharge opening and means for supplying liquid under pressure to the nozzle.

2. In apparatus for mixing the ingredients of hydraulic cement concrete while in transit, and applying them by forcible projection, the combination of a receptacle for dry material having a discharge opening, a feed wheel having openings arranged to register one after another with said discharge opening, means within the control of the operator for regulating the speed of the feed wheel, and a nozzle connected with said discharge opening and means for supplying liquid under pressure to the nozzle.

3. In apparatus for mixing and applying hydraulic cement and forcibly projecting it in the form of a dirigible jet, the combination of a receptacle for dry material, and a nozzle having a connection with said receptacle, means for feeding the material to and through said connection, a liquid supply means connecting it to the nozzle and means for varying the proportions of liquid and dry material mixed and delivered thereby.

4. In apparatus for mixing and applying hydraulic cement, the combination of a receptacle for dry material, a nozzle having a connection with said receptacle and a liquid supply connection and provided with means for varying the discharge of liquid, a feed wheel adapted to regulate the delivery of dry material from said receptacle into the nozzle connection therewith, and means under the control of the operator for regulating the speed of the feed wheel.

5. In apparatus for mixing and applying plastic or adhesive material, the combination of a receptacle for dry material having a discharge opening in the lower part thereof, a compressed air supply connection having an opening opposite said discharge opening, a feed wheel having openings each arranged to register simultaneously with said discharge opening and the opposite air supply opening, means for rotating the feed wheel to bring the openings into such registration one after the other and a nozzle connected with the discharge opening of said receptacle and having a separate liquid supply connection.

6. In apparatus for mixing and applying plastic or adhesive material, the combination of a receptacle for dry material having a discharge opening in the lower part thereof, a filling receptacle opening at the bottom into the upper part of the other receptacle and having an opening in the upper part thereof, closures for the openings in the upper parts of said receptacles, a nozzle connected with the discharge opening of the lower receptacle and having a liquid supply connection, connections for supplying compressed air to said receptacles, and means for controlling the admission and release of compressed air to and from the upper receptacle.

7. In apparatus for mixing and applying plastic or adhesive material, the combination of a receptacle for dry material, having a discharge opening in the lower part thereof, a filling receptacle opening at the bottom into the upper part of the other receptacle and having an opening in the upper part thereof, closures for the openings in the upper parts of said receptacles, a nozzle connected with the discharge opening of the lower receptacle and having a liquid supply connection, a source of compressed air connected with the lower part of the lower receptacle, and a valve-controlled air connection between said receptacles.

8. In apparatus for mixing and applying plastic or adhesive material, the combination of a receptacle for dry material having a discharge opening in the lower part thereof, a filling receptacle opening into the upper part of the lower receptacle and having an opening in the upper part and a closure therefor, a closure for the opening between said receptacles adapted to open automatically when air pressure is admitted into the upper receptacle and provided with external closing means, a nozzle connected with the discharge opening of the lower receptacle and having a liquid supply connection, a source of compressed air connected with the lower receptacle, and means for admitting compressed air into the upper receptacle.

9. In a machine for mixing and applying hydraulic cement concrete, etc., a receptacle for dry material having a discharge outlet in the lower part, a nozzle connected with said outlet, a source of compressed air, means connecting it to the receptacle, said means directed toward the discharge outlet, a feed wheel between the mouth of the inlet and the outlet, the wheel fitting loosely so as to permit escape of air into and through the material, and means for actuating the feed wheel.

10. In a machine for mixing and applying hydraulic cement and concrete, a receptacle for dry material having a discharge outlet in its lower portion, a nozzle connected therewith; a source of compressed air; means connecting it to said receptacle, said means disposed toward the outlet, a movably-mounted, perforated feed member, and means for actuating the feed member to move the perforated portion through the material, and then bring each perforation into register of the inlet supply and the outlet.

11. In apparatus for mixing and applying hydraulic cement, the combination of a receptacle for dry material, having a discharge opening in the lower part thereof, a nozzle connected with said opening, and means for introducing compressed air into said receptacle adjacent to said opening, said means including an inlet port disposed toward the opening, means for supplying liquid under pressure, and means connecting said liquid supply to the nozzle.

12. In apparatus for mixing and applying plastic or adhesive material, the combination of a number of receptacles for dry material each having a discharge opening in the lower part thereof, a nozzle connected with the discharge opening of the last receptacle, a source of compressed air connected with the first receptacle adjacent to its discharge opening, and a conduit leading from the discharge opening of each receptacle except the last and opening into the next receptacle adjacent to its discharge opening.

13. In apparatus for mixing and applying plastic or adhesive material, the combination of a number of receptacles for dry material, each having a discharge opening in the lower part thereof, a nozzle connected with the discharge opening of the last receptacle, a source of compressed air connected with the first receptacle adjacent to its discharge opening, and conduits leading, one from the discharge opening of each receptacle except the last, into the next receptacle adjacent to its discharge opening, and a conduit leading from the upper part of some of the receptacles into the next receptacle adjacent its discharge opening.

14. In apparatus for mixing and applying plastic or adhesive material, the combination of a number of receptacles for dry material each having a discharge opening in the lower part thereof, a nozzle connected with the discharge opening of the last receptacle, a source of compressed air connected with the first receptacle adjacent to its discharge opening, conduits leading one from the discharge opening and another from the upper part of some of the receptacles other than the last and opening together into the next receptacle adjacent to its discharge opening, and a feed wheel for each receptacle having openings adapted to pass one after another between and register with its air supply connection and discharge opening.

15. In apparatus for mixing and applying plastic or adhesive material, the combination of a closed receptacle for dry material having a discharge opening in the lower part thereof, an inclosed feed wheel adjacent to said opening, a mixing nozzle having branches one of which has a flexible connection with the discharge opening of said receptacle and the other a flexible connection with a source of liquid under pressure, means for supplying compressed air to the connection to propel the dry material to and through the nozzle and a valve to control the dry material.

16. In apparatus for mixing and applying plastic or adhesive material, the combination of a receptacle for dry powdered or comminuted material having a discharge opening, a feed wheel inclosed in said receptacle and having openings arranged to register one after another with said discharge opening, a compressed air supply connection registering with the openings in said feed wheel as they are brought opposite said discharge opening, and a mixing nozzle having flexible connections with the discharge opening of said receptacle and with a source of liquid under pressure.

17. In an apparatus for mixing and applying plastic material; the combination of a receptacle for dry material, having a discharge opening; a feed member having an opening; means for supplying compressed air; means for leading the air supply to the receptacle at a point adjacent the discharge opening; a mixing nozzle; flexible means connecting it with the discharge opening; a source of liquid under pressure; means connecting it with the nozzle; means for moving the feed member to pass the apertured portion thereof, through the material in the receptacle, and then to bring it simultaneously into registration with the discharge and inlet opening.

18. In apparatus for mixing and applying plastic material, the combination of a receptacle for dry, powdered or comminuted material, having a discharge opening, a feed wheel in said receptacle having openings arranged to register one after another with said discharge opening; means for actuating the wheel; a compressed air supply connection registering with the openings in the feed wheel as they are brought opposite said discharge opening; a mixing nozzle having a flexible connection with the discharge opening of the receptacle; a source of liquid under pressure; a flexible connection between said source and the nozzle; the feed wheel being constructed to provide an aperture leading from the air supply to the body of the receptacle so that a portion of the air passes through the main body of dry material into the receptacle.

19. In apparatus for mixing and applying plastic or adhesive material, the combination of a closed receptacle for dry powdered or comminuted material having a discharge opening, a feed wheel inclosed in said receptacle and having openings arranged to register one after another with said discharge opening, a compressed air supply connection leading into said receptacle opposite and adjacent to its discharge opening, a filling receptacle opening at the bottom into the upper part of the other receptacle and having a filling opening in the upper part thereof, closures for the openings in the upper parts of said receptacles, an air passage leading from the lower into the upper receptacle, and a mixing nozzle having flexible connections with the discharge opening of the lower receptacle and with a source of liquid under pressure.

20. In apparatus for mixing hydraulic cement and applying the same by projection, the combination of a closed receptacle for dry material, a closed liquid reservoir, a mixing nozzle having separate flexible connections with said receptacle and with said liquid reservoir, a source of compressed air and means for leading air from the same to said receptacle and reservoir.

21. In apparatus for mixing and applying plastic or adhesive material, the combination of a closed receptacle for dry material having a discharge opening in the lower part thereof, a closed liquid reservoir, a source of compressed air connected with said receptacle adjacent to its discharge opening and having a valve controlled connection with said reservoir, a valve controlled liquid supply connection leading into said reservoir, and a mixing nozzle having connections with said receptacle and reservoir.

22. In apparatus for mixing and applying plastic or adhesive material, the combination of a receptacle for dry material having a discharge opening for the material, a nozzle, a pipe connecting the nozzle with the discharge opening of said receptacle, a source of compressed air connected with said receptacle and with the nozzle pipe adjacent to the receptacle, and means for closing said pipe and opening the air supply connection therewith beyond the point of closure and vice versa.

23. In apparatus for mixing and applying plastic or adhesive material, the combination of a receptacle for dry material, a nozzle having a flexible connection with said receptacle, a valve therein, a means for opening and closing said valves and means movable relatively to said receptacle for controlling said opening and closing means to start and stop the delivery of material from said receptacle into the nozzle connection.

24. In apparatus for mixing and applying plastic or adhesive material the combination of a plurality of receptacles for dry materials, a nozzle connected with said receptacles, feed wheels, means for actuating them and controlling them to deliver the materials and to regulate the delivery of the materials from said receptacles to the nozzle, in the desired proportions, valves controlling the delivery connections of said receptacles, and means under control of the operator for stopping and starting said wheels and operating said valves.

25. In apparatus for mixing and applying plastic or adhesive material, the combination of a receptacle for dry material, closed liquid reservoirs provided with valve controlled vents opening from the upper part thereof, a liquid supply pipe having separate valve controlled connections with said reservoirs, a source of compressed air having separate valve controlled connections with said reservoirs, and a nozzle having a connection with the receptacle for dry material and separate valve controlled connections with said reservoirs.

26. In apparatus for mixing and applying plastic or adhesive material, the combination of a receptacle for dry material, closed liquid reservoirs, a source of compressed air having separate valve controlled connections with said reservoirs, a pump for filling said reservoirs having separate valve controlled discharge connections therewith, and a nozzle having a connection with said receptacle for dry material, and separate valve controlled connections with the lower parts of said reservoirs.

27. In apparatus for mixing and applying hydraulic cement, the combination of a closed receptacle for dry powdered or comminuted material provided with a feed wheel, a closed liquid reservoir, a nozzle having a valve controlled connection with said receptacle and a separate connection with said reservoir, a compressed air tank, means for leading air from the tank to said receptacle and reservoir, a compressor for supplying said tank with compressed air, and a motor for operating said compressor and feed wheel.

28. In apparatus for mixing and applying plastic or adhesive material, the combination of a closed receptacle for dry material having a discharge opening in the lower part thereof and a feed wheel adjacent thereto, a closed liquid reservoir, a nozzle having a valve controlled connection with said receptacle and a separate connection with said reservoir, a compressed air tank connected with said receptacle and reservoir, a compressor connected with said tank, a motor for operating said compressor and feed wheel, a clutch for connecting the feed wheel with the motor, and a motor for operating said clutch and the valve in the dry feed connection of the nozzle.

29. In apparatus for mixing and applying plastic or adhesive material, the combination of a closed receptacle for dry material provided with a feed wheel, a nozzle, a pipe connecting the nozzle with said receptacle, a valve controlling the pipe, a driving shaft, a clutch for connecting the feed wheel with the driving shaft, a motor for operating said clutch and valve, and portable means for controlling the operation of said motor.

30. In apparatus for mixing plastic or adhesive material, the combination of a closed receptacle for dry material provided with a feed wheel, a nozzle, a flexible pipe connecting said nozzle with said receptacle and provided adjacent thereto with a valve, a driving shaft, a clutch for connecting the feed wheel with said shaft, a fluid pressure motor for operating said clutch and valve, and a portable valve having flexible connections with said motor and with a source of fluid pressure for controlling the operation of the motor in different positions at a distance therefrom.

31. In apparatus for mixing and applying plastic or adhesive material, the combination of a car provided with a motor, a closed receptacle for dry material provided with a feed wheel, means for supplying liquid under pressure, a compressed air tank connected with said receptacle, and a compressor, all mounted on said car, means for connecting the propelling gear of the car, the compressor and the feed wheel with said motor, and a nozzle having separate flexible connections with said receptacle and liquid supply.

32. In a machine for mixing and applying plastic material; the combination of a plurality of receptacles for dry material, each having an outlet for the material from the lower part; a nozzle connected with said outlets; means for delivering compressed air into the receptacles adjacent the outlets, and separate means for leading water under pressure to the nozzle.

33. In a machine for mixing and applying plastic material; combination of a plurality of receptacles for dry material, each having a discharge opening in the lower part thereof; a nozzle; means for connecting said openings with the nozzle; means disposed toward the openings for delivering air therein; a supply of liquid under pressure and separate means for leading the same to the nozzle.

34. In a machine for mixing and applying hydraulic cement, etc.; a container for dry material having a discharge opening; means for supplying air under pressure to the receptacle; a nozzle; a discharge passage connecting the opening and nozzle; means for controlling said passage to open and close it; a second passage or by-pass leading from the air supply to a point in the discharge passage beyond the controlling means; means for controlling the by-pass to open and close it, and actuating means connecting the two controlling means to open the by-pass when the discharge passage is closed and to close the by-pass when the discharge passage is opened.

35. A machine for mixing the ingredients of hydraulic cement concrete in transit and applying the material by projection, having in combination a receptacle for dry material, provided with a discharge outlet, a compressed air supply pipe leading to the receptacle, the mouth of the pipe being opposite to and disposed toward the discharge outlet; means for supplying air to the air pipe; a feed wheel in the receptacle having an opening adapted to connect the discharge outlet and the air supply pipe; and means for rotating the feed wheel to move the aperture therein through the material in the receptacle, and then to bring it into registration with the air inlet and the discharge outlet; a nozzle; means for supplying liquid under pressure; means connecting the discharge to the nozzle, and separate means connecting the liquid supply thereto.

36. A machine for mixing the ingredients of hydraulic cement concrete while in transit, and applying them by forcible projection; having in combination a receptacle for dry material, provided with a discharge opening, an air supply passage to the receptacle, the mouth of which is opposite and disposed toward the discharge outlet; means for supplying air to the air passage; a feed wheel having an opening adapted to connect the discharge opening and the mouth of the air supply passage, the wheel being fitted loosely between these two members so that the escape of some of the air into the body of the material in the container is permitted; means for rotating the feed wheel to move the apertured portion through the material and then bring it into registration simultaneously with the mouths of the air passage and the discharge opening, a nozzle, means for supplying liquid under pressure, means connecting the discharge to the nozzle, and separate means connecting the liquid supply to the nozzle.

37. A machine for mixing concrete and forcibly projecting it into the position of final rest, having in combination a receptacle for dry material, a mixing nozzle having flexible connection with said receptacle, a source of liquid under pressure, separate means connecting it to the nozzle, and means for producing a blast of air from the receptacle through the nozzle.

38. In an apparatus substantially as described, a nozzle with two conduits leading into the nozzle in combination with means to supply comminuted material mixed with air under pressure to one conduit and liquid under pressure to the other, the ingredients meeting in the nozzle.

39. In an apparatus substantially as described, a nozzle, two conduits leading into the nozzle in combination with means to supply comminuted material mixed with air under pressure to one conduit and liquid under pressure to the other, the ingredients meeting in the nozzle and adjustable means for fixing the proportions of liquid and dry material delivered to the nozzle.

40. In an apparatus substantially as described, a single conduit or nozzle with two conduits leading into the single conduit, a rubber lining for said nozzle in combination with means for supplying comminuted material mixed with air under pressure to one of said conduits and liquid under pressure to the other, the ingredients meeting in the common nozzle.

41. In an apparatus substantially as described, a single conduit or nozzle, two conduits leading into the nozzle and means for adjusting the length of the nozzle and the size of its orifice in combination with means for supplying comminuted material mixed with air under pressure through one of said conduits and liquid under pressure through the other of said conduits and means for directing the course of the liquid as it enters the nozzle, the ingredients meeting in the common nozzle.

42. In an apparatus substantially as described, a single conduit or nozzle, an elastic lining for said nozzle, two conduits leading into the nozzle, means for adjusting the length of the nozzle and the size of its orifice in combination with means for supplying comminuted material mixed with air under pressure through one of said conduits and liquid under pressure through the other of said conduits and means for directing the course of the liquid as it enters the nozzle, the ingredients meeting in the common nozzle.

43. In an apparatus substantially as described, a single conduit or nozzle, a rubber lining for said nozzle, two conduits leading into the nozzle, means for adjusting the length of the nozzle and the size of its orifice in combination with means for supplying comminuted material mixed with gas under pressure through one of said conduits and liquid under pressure through the other of said conduits and means for directing the course of the liquid as it enters the nozzle so that the ingredients meet in the common nozzle.

44. In an apparatus substantially as described, a single conduit or nozzle and two conduits leading into said nozzle, one delivering in the line of the axis of the nozzle, and the other delivering an annular flow at an angle to such axis in combination with means to supply comminuted material mixed with a gas under pressure to one of said conduits and a liquid under pressure to the other of said conduits so that the ingredients supplied meet in the common nozzle.

45. In an apparatus substantially as described, a single conduit or nozzle with two conduits leading into the nozzle one delivering in the line of the axis of the nozzle and the other delivering an annular flow at an angle to and intersecting such axis, means within the nozzle to control the volume of such flow, means to adjust the length of the nozzle and the size of its orifice in combination with means to supply comminuted material mixed with fluid under pressure through one of said conduits, and liquid under pressure through the other of said conduits, the ingredients meeting in the nozzle.

46. In an apparatus substantially as described, a single conduit or nozzle having an elastic lining with two conduits leading into the nozzle, one delivering in the line of the axis of the nozzle and the other delivering in a direction intersecting such axis, means within the nozzle to control the volume of such flow, means to adjust the length of the nozzle and the size of its orifice in combination with means to supply comminuted material mixed with fluid under pressure through one of said conduits and liquid under pressure through the other of said conduits, the ingredients meeting in the nozzle.

47. In an apparatus substantially as described, a single conduit or nozzle having a rubber lining with two conduits leading into the nozzle, one delivering in the line of the axis of the nozzle and the other delivering an annular flow at an angle to and intersecting such axis, means within the nozzle to control the volume of such flow, means to adjust the length of the nozzle and the size of its orifice in combination with means to supply comminuted material under pressure through one of said conduits and liquid under pressure through the other of said conduits, the ingredients meeting in the nozzle.

48. In an apparatus substantially as described the combination of a conduit to convey comminuted material under air pressure to the nozzle, said conduit being sectionally divided and including between such sections a sealed container, a feed wheel provided with a series of perforations and mounted within the container to revolve freely in the gap between the sections of the conduit and adjacent thereto, the lower side of said feed wheel being adjacent to the base of the container so that when the wheel revolves, the material within the container will in a measure be confined within the pockets of the feed wheel and with the revolution of that wheel such material will be conveyed into the conduit and by the air pressure forced out of the pocket and conveyed thence to the nozzle.

49. In a machine for mixing and applying hydraulic cement concrete, etc., means for maintaining a supply of dry material, a discharge pipe, a nozzle connected thereto, means for maintaining a current of air under pressure therethrough, means for positively moving successive charges of the material into the air current and a source of liquid under pressure also connected to the nozzle.

50. In a machine for mixing and applying hydraulic cement, means for maintaining a supply of dry material, a discharge pipe, means for passing a current of air therethrough, the pipe having a lateral opening, a feed member having a pocket and adapted to pass through this opening, means for filling the pocket with dry material and moving it when filled through the opening into the discharge pipe.

51. In a machine for mixing and applying cement concrete, etc., means for maintaining a supply of comminuted material, a delivery pipe, means for creating a draft or current of air therethrough, a feed member having a perforation, and means for moving the feed member to carry the perforation through the material and then bringing it into registration with the pipe opening.

52. In a machine for mixing and applying cement and concrete, means for maintaining a supply of comminuted material, a delivery pipe, means for creating a draft or current of air therethrough, a feed member having an aperture, and means for moving the feed member to pass the aperture through the comminuted material so that it may be filled thereby, and then interposing it in the air current so that the current passes through the aperture, taking up the material and conveying it to the point where mixing takes place.

In witness whereof I hereto affix my signature in presence of two witnesses.

CARL E. AKELEY.

Witnesses:
 HENRY L. RUPERT,
 MORRIS J. BERNSTEIN.